US009287556B2

(12) United States Patent
Neumann et al.

(10) Patent No.: US 9,287,556 B2
(45) Date of Patent: Mar. 15, 2016

(54) POROUS CARBON PRODUCT, METHOD FOR THE PRODUCTION THEREOF, AND USE OF THE SAME

(75) Inventors: Christian Neumann, Hungen (DE); Joerg Becker, Niddatal (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 490 days.

(21) Appl. No.: 13/881,675

(22) PCT Filed: Oct. 19, 2011

(86) PCT No.: PCT/EP2011/068243
§ 371 (c)(1),
(2), (4) Date: Apr. 25, 2013

(87) PCT Pub. No.: WO2012/055731
PCT Pub. Date: May 3, 2012

(65) Prior Publication Data
US 2013/0209891 A1 Aug. 15, 2013

(30) Foreign Application Priority Data

Oct. 25, 2010 (DE) .................. 10 2010 049 249

(51) Int. Cl.
*H01M 4/04* (2006.01)
*H01M 4/133* (2010.01)
(Continued)

(52) U.S. Cl.
CPC .............. *H01M 4/133* (2013.01); *B01J 20/20* (2013.01); *B01J 20/28042* (2013.01);
(Continued)

(58) Field of Classification Search
CPC ... H01M 4/133; H01M 4/1393; H01M 4/583; H01M 2004/021; C01B 31/00; C01B 31/04; C01B 31/084

USPC ........ 429/231.8; 264/29.1; 252/502; 423/414
See application file for complete search history.

(56) References Cited

U.S. PATENT DOCUMENTS

| 4,263,268 A | 4/1981 | Knox et al. |
| 6,596,437 B2 | 7/2003 | Yoon et al. |

(Continued)

FOREIGN PATENT DOCUMENTS

| DE | 2946688 A1 | 6/1980 |
| EP | 2037515 A1 | 3/2009 |
| WO | 2009/051925 A1 | 4/2009 |

OTHER PUBLICATIONS

Ryong Ryoo et al., "Synthesis of Highly Ordered Carbon Molecular Sieves via Template-Mediated Structural Transformation," Journal of Physical Chemistry B, Materials, Surfaces, Interfaces and Biophysical, vol. 103, No. 37, pp. 7743-7746, American Chemical Society, Washington, DC, US, Sep. 16, 1999.

*Primary Examiner* — Basia Ridley
*Assistant Examiner* — James Erwin
(74) *Attorney, Agent, or Firm* — Tiajoloff & Kelly LLP (57) ABSTRACT

For use as electrode material for a lithium battery, porous templates are impregnated with a carbon feedstock that can be graphitized. This frequently results in only a low thickness of the deposited, graphite-like layer, such that generally several such infiltration and carbonation processes must be carried out consecutively. In order to provide a cost-effective product which is made of porous carbon and has high porosity and a low surface, according to the invention a method comprises the following method steps: (a) preparing a porous carbon structure having a large specific surface, (b) infiltrating the carbon structure with a precursor substance for carbon that can be graphitized, (c) carbonizing the precursor substance to form the carbon product having a low specific surface, wherein preparing the carbon structure according to method step (a) comprises the following: (I) preparing a template containing pores, (II) infiltrating the pores of the template with a solution that contains a precursor of carbon that cannot be graphitized, (III) carbonizing the precursor forming the carbon structure having the first specific surface, and (IV) removing the template.

20 Claims, 5 Drawing Sheets (51) Int. Cl.
  *C01B 31/08*   (2006.01)
  *H01M 4/583*   (2010.01)
  *C01B 31/04*   (2006.01)
  *B01J 20/20*   (2006.01)
  *B01J 20/28*   (2006.01)
  *B01J 20/30*   (2006.01)
  *C01B 31/00*   (2006.01)
  *C04B 35/52*   (2006.01)
  *C04B 38/06*   (2006.01)
  *H01M 4/1393*  (2010.01)
  *H01M 4/587*   (2010.01)
  *H01M 4/96*    (2006.01)
  *H01M 10/052*  (2010.01)
  *C04B 111/00*  (2006.01)
  *H01M 4/02*    (2006.01)

(52) U.S. Cl.
  CPC ..... *B01J 20/28057* (2013.01); *B01J 20/28059* (2013.01); *B01J 20/28069* (2013.01); *B01J 20/3064* (2013.01); *C01B 31/00* (2013.01); *C01B 31/04* (2013.01); *C01B 31/084* (2013.01); *C04B 35/521* (2013.01); *C04B 38/0615* (2013.01); *H01M 4/0402* (2013.01); *H01M 4/0416* (2013.01); *H01M 4/0471* (2013.01); *H01M 4/1393* (2013.01); *H01M 4/583* (2013.01); *H01M 4/587* (2013.01); *H01M 4/96* (2013.01); *H01M 10/052* (2013.01); *C04B 2111/00853* (2013.01); *H01M 2004/021* (2013.01); *Y02E 60/122* (2013.01); *Y02E 60/50* (2013.01)

(56) References Cited

U.S. PATENT DOCUMENTS

| | | | |
|---|---|---|---|
| 6,887,622 B2 * | 5/2005 | Ryu | H01M 4/587 |
| | | | 23/314 |
| 2005/0169829 A1 | 8/2005 | Dai et al. | |
| 2010/0291440 A1 | 11/2010 | Miller et al. | |
| 2010/0297500 A1 | 11/2010 | Kawai et al. | |

* cited by examiner

POROUS CARBON PRODUCT, METHOD FOR THE PRODUCTION THEREOF, AND USE OF THE SAME

The present invention refers to a method for producing a porous carbon product.

Furthermore, the present invention refers to a porous carbon product with core-shell structure consisting of a core of a first carbon variety and of a shell surrounding the core and consisting of a second carbon variety.

Moreover, the invention refers to a use of the carbon product.

Monolithic shaped bodies of carbon are e.g. used in electrodes for fuel cells, supercapacitors and electrical accumulators (secondary batteries) and as adsorbents for liquids and gases, as storage medium for gases, as carrier material in chromatographic applications or catalytic processes and as a material in mechanical engineering or in medical technology.

PRIOR ART

The use for electrodes of rechargeable lithium batteries requires an electrode material that is capable of reversibly inserting and removing (intercalating) lithium with a small charge loss. Charging times that are as short as possible as well as high charging capacities of the battery are desired at the same time. A porosity (permeability) that is as high as possible together with a surface that is as small as possible is desired for this. Electrode materials with a large surface are subject to a relatively high charge loss, which loss is substantially expressed as an irreversible loss in the first intercalation of lithium.

DE 29 46 688 A1 discloses methods for producing porous carbon using a temporary preform of porous material (a so-called "template"). A precursor substance for carbon is deposited in the pores of the "template" of inorganic matrix material which has a surface of at least 1 m²/g. SiO$_2$ gel, porous glass, alumina and other porous refractory oxides are named as suitable matrix materials for the template. The matrix material has a porosity of at least 40% and a mean porosity in the range of 3 nm to 2 μm.

Polymerizable organic materials, such as a mixture of phenol and hexamine or a phenol-formaldehyde resol, are recommended as the precursor substance for carbon. It is introduced as a liquid or gas into the pores of the template and polymerized. After polymerization and subsequent carbonization the inorganic matrix material of the template is removed, e.g. by dissolution in NaOH or in fluoric acid.

A particle- or flake-shaped carbon product is thereby obtained which has a pore structure corresponding approximately to the material distribution of the template and which is basically suited as a start material for producing electrodes for Li batteries.

An easy access to the inner surfaces is decisive for a good and quick charging capacity. A so-called "hierarchical porosity" is advantageous in this connection. Large surfaces can be provided by pores in the nanometer range. To enhance the accessibility to said pores, these are ideally connected via a continuous macroporous transport system.

A monolithic carbon product having such a hierarchical pore structure of macropores and mesopores is described in US 2005/0169829 A1. For the production of the hierarchical pore structure a SiO$_2$ template is produced by heating a dispersion of silica spheres with diameters of 800 nm to 10 μm and a polymerizable substance in a mold, so that polymerization yields a porous silica gel that after removal of the excessive liquid is dried and completely polymerized.

The pores of the SiO$_2$ template obtained thereby are subsequently impregnated with a precursor substance for carbon, the carbon precursor substance is carbonized into carbon and the SiO$_2$ template is then removed by dissolution in HF or NaOH. The carbon product obtained thereby also comprises a pore structure approximately corresponding to the template.

As a rule, surface morphology and pore structure of the carbon products produced in this way are not optimal and require aftertreatment. For instance coatings in the case of which the inner surfaces of the carbon product are provided by way of infiltration with a further layer of graphitic carbon have turned out to be useful to reduce an excessively high microporosity.

A carbon-based composite body is thereby obtained in which two or more carbon varieties in the core-shell structure are arranged relative to one another.

U.S. Pat. No. 6,596,437 B2, for instance, describes a carbon-based material to be used for the electrode of a lithium ion battery, which consists of a core of crystalline graphite which is surrounded by a shell having a thickness between 1 nm and 200 nm and consisting of amorphous or turbostratic graphite. For the production process natural or synthetic graphite particles are coated with an amorphous precursor substance for graphitic carbon and are subsequently carbonized. Tetrahydrofuran (THF) soluble phenol resin or pitch is used as the precursor substance.

TECHNICAL OBJECT

Standard graphitizable carbon precursors for infiltration, particularly mesophase pitch, are not soluble in a high concentration and contain a fraction of insoluble constituents. Due to infiltration with subsequent carbonization the thickness of the deposited graphite-like layer will therefore be only small, so that several infiltration and carbonization processes of this type have to be performed one after the other as a rule. Such multiple processes, however, increase the manufacturing costs and may cause inhomogeneities, e.g. due to the gradual clogging of infiltration channels. Moreover, mesophase pitch is expensive.

It is the object of the present invention to provide an inexpensive product of porous carbon having a high porosity degree and a small surface area, which is particularly well suited for use as an electrode material for a lithium battery.

Furthermore, it is the object of the present invention to indicate a method which permits an inexpensive production of such a product of carbon and which especially also in the case of a small number of infiltration processes yields a porous carbon product having an inner surface and a morphology which are particularly suited for use as an electrode material for a lithium battery.

Furthermore, it is the object of the present invention to indicate a suitable use of the carbon product according to the invention.

GENERAL DESCRIPTION OF THE INVENTION

As for the method, this object is achieved according to the invention by a method comprising the following method steps:

(a) providing a porous carbon structure with a first specific surface area, (b) infiltrating the carbon structure with a precursor substance for graphitizable carbon, (c) carbonizing the precursor substance with formation of the carbon product with a second specific surface area smaller than the first specific surface area, wherein providing the carbon structure according to method step (a) comprises:
(I) providing a template containing pores,
(II) infiltrating the pores of the template with a solution containing a precursor for non-graphitizable carbon,
(III) carbonizing the precursor with formation of the carbon structure having the first specific surface area, and
(IV) removing the template.

The method according to the invention comprises at least two infiltration processes using carbonaceous components with a respective subsequent carbonization. The result of the first of these processes is a porous carbon structure of so-called "turbostratic", non-graphitizable carbon. To produce the same, the pores of a porous template are infiltrated with a solution containing at least one non-graphitizable carbonaceous component which after carbonization yields non-graphitic and also non-graphitizable carbon, which is also called "turbostratic" carbon" or "hard carbon" in the literature.

Turbostratic carbon comprises a layer structure of graphene layers. In contrast to graphite with a crystallographic long-range order of the graphene layers, the layer structure in turbostratic carbon is however more or less disordered due to translation or rotation of individual layer stacks. Almost all of the synthetically produced carbon products and so-called amorphous carbon (glassy carbon) are present with a turbostratic layer structure. Carbon with a turbostratic layer structure is not graphitizable by heating and is here also designated as a "non-graphitizable carbon". The fact that a great number of commercially available carbonaceous mass chemicals can be used as a precursor for non-graphitizable carbon and that in addition these are soluble in a high concentration is of relevance to the present invention. This offers the option of a relatively simple and inexpensive production of non-graphitizable turbostratic carbon.

For instance, water-soluble organic carbon compounds, such as saccharose, fructose or glucose, should be mentioned as a precursor for non-graphitizable carbon. In low-viscosity solutions, these can be infiltrated into the pores of the template very easily and uniformly. The infiltration of the precursor into the pores of the template is here carried out on the basis of known techniques; particular mention should here be made of immersion, pumping and swiveling.

Infiltration with the non-graphitizable precursor for turbostratic carbon is carried out as a single infiltration or multiple infiltration of the template. After each infiltration, from time to time, or once in a completing manner, a carbonization process is provided which yields a layer of turbostratic carbon in the pores of the template. On account of the low viscosity of the precursor solution a saturation of the template pores is reached after one infiltration or after relatively few infiltrations, and even plural infiltrations entail relatively small costs.

Despite the presence of layer stacks of carbon, of which the electrode material of rechargeable lithium batteries preferably exists, turbostratic (non-graphitizable) carbon is normally not suited for this application. The reason is that it often shows a high microporosity and together with this a high specific surface area that leads to irreversible capacity losses upon the first charging of the battery.

Therefore, according to the invention the turbostratic carbon produced due to the first infiltration process is coated in a second infiltration process with another, namely a graphitizable, carbon material. Due to carbonization this material forms graphite or a graphite-like layer structure which although it may also contain turbostratic fractions, is more ordered and more similar to graphite than the turbostratic carbon obtained from the non-graphitizable precursor, and which particularly shows a low microporosity and thus also a smaller specific surface area. During carbonization the graphitizable precursor substance is subjected to a noticeable relocation of graphene layers towards a graphite structure and is also called "soft carbon" in the literature.

The carbon variety obtained as a result of the carbonization of the graphitizable precursor substance will also be called "graphite-like carbon" in the following. The graphite-like carbon reduces the microporosity and the specific surface area of the composite material without considerably impairing the accessibility to the carbon layer stacks of the turbostratic carbon.

Micropores in the sense of this invention have a pore size in the range of less than 2 nm. Mesopores have a pore size in the range of 2 nm to 50 nm.

This produces a core-shell structure in which the turbostratic, non-graphitizable carbon forms the core, and the graphitic carbon produced in the second infiltration and carbonization process forms the shell.

The turbostratic carbon is obtained as a layer on the surfaces of the template. The material of the template is removed before the second infiltration process so that the carbon produced in the second infiltration and carbonization process adjoins the turbostratic carbon on all sides (and not only on the surface oriented away from the preform).

The microporous surface of the turbostratic carbon is drastically reduced by the larger molecules of a preferably aromatic precursor substance for graphitizable carbon, so that a carbon product is obtained having properties corresponding in terms of morphology and surface to those of a carbon product consisting of purely graphitic and expensive start material.

Hence, the method according to the invention yields an inexpensive product of porous carbon having a high porosity and a small surface, which is particularly suited for use as an electrode material for a lithium battery.

Preferably, water-soluble carbohydrate, preferably saccharose, is used as the precursor for the turbostratic carbon according to method step (a) (II).

Water-soluble carbohydrates are obtainable as inexpensive mass chemicals. The solutions of the carbohydrates—alcoholic or other organic solutions are here also possible—are distinguished by a low viscosity, so that even narrow pore channels can be infiltrated easily, completely and uniformly. After infiltration and removal of the solvent a layer of turbostratic, non-graphitizable carbon is obtained therefrom on the surfaces of the template after carbonization.

It has turned out to be useful when during carbonization of the precursor according to method step (a) (III) a carbon structure is produced with a specific surface area (according to BET) in the range of 400 $m^2/g$ to 600 $m^2/g$.

The specific surface area is determined according to DIN ISO 9277—May 2003 ("Bestimmung der spezifischen Oberfläche von Feststoffen durch Gasadsorption nach dem BET Verfahren").

Furthermore, it has turned out to be advantageous when carbonization according to method step (c) is carried out in an inert gas atmosphere or in vacuum at a temperature of at least 500° C.

Carbonization of the carbon precursor substance according to method step (c) is carried out at a high temperature of up to 3000° C., but preferably at a much lower temperature below 1000° C., in gas that is oxygen-free, if possible, or in vacuum. The minimum temperature of 500° C. for carbonization is determined by the decomposition temperature of the graphitizable precursor substance.

It has turned out to be useful when carbonization is followed by an activation treatment in oxidizing atmosphere at a temperature in the range of 200° C. to 450° C., preferably at a temperature in the range of 350° C. to 425° C.

The activation treatment in oxidizing atmosphere serves the selective oxidation and saturation of active carbon centers within the carbon product without any "burning" of the total structure.

During carbonization of the carbon precursor substance according to method step (c) a carbon product with a specific surface area (according to BET) in the range of less than 50 $m^2/g$ is preferably produced.

The smaller the specific surface area after carbonization the smaller are the irreversible capacity losses during charging of a battery made from the carbon product.

The template consists for example of a porous, glassy or ceramic material. In a particularly preferred method variant it is intended that the provision of the template according to method step (a) (I) comprises the production of synthetic silicic-acid soot with a hierarchical pore structure.

The template of porous silicic-acid soot (hereinafter also called "$SiO_2$ soot preform" or shortly "soot preform") is just temporarily present. The "hierarchical porosity" of the soot preform is reflected on the final carbon product and permits an easy accessibility to the inner surfaces and is decisive for a good and quick charging capacity. Large surfaces can be provided by pores in the nanometer range. To improve the accessibility to these pores, these are ideally connected via a continuous macroporous transport system.

The $SiO_2$ soot preform is e.g. produced in a soot deposition method. In comparison with the manufacturing method through the "sol-gel route", this method is relatively fast and permits a cost-efficient production of templates for carbon products on an industrial scale. A liquid or gaseous silicon-containing start substance is subjected to a chemical reaction (hydrolysis or pyrolysis) and deposited from the gas phase as a solid component on a deposition surface. The reaction zone is e.g. a burner flame or an electric arc (plasma). With the help of such plasma or CVD deposition methods, which are e.g. known under the names OVD, VAD, MCVD, PCVD or FCVD methods, other synthetic materials such as tin oxide and titanium nitride are produced on an industrial scale apart from synthetic silicic-acid soot.

Synthetic porous silicic acid ($SiO_2$) is thus producible on an industrial scale at relatively low costs by means of such soot deposition methods using inexpensive start substances. The soot preform withstands high temperatures during carbonization. The upper temperature limit is given by the initiation of the reaction of $SiO_2$ with carbon into SiC (at about 1000° C.).

The mean relative density of the soot preform is typically in the range of 10% to 30%, preferably at less than 20%, of the theoretical specific density of quartz glass. The lower the density, the smaller are the efforts for removing the template material and the accompanying material loss. At mean densities of less than 10%, however, one obtains a small mechanical stability, which makes the handling of the soot preform more difficult.

It is important that during the soot deposition process the $SiO_2$ particles are deposited in an agglomerated or aggregated form as silicic acid soot which has an anisotropic mass distribution with hierarchical pore structure. During gas phase deposition primary particles with particle sizes in the nanometer range are produced in the reaction zone, which particles on their route to the deposition surface agglomerate and are present in the form of more or less spherical agglomerates or aggregates on the deposition surface; these shall also be called "secondary particles" hereinafter. Depending on their place of origin within the reaction zone and their route to the deposition surface, the secondary particles consist of a different number of primary particles and therefore basically show a wide particle size distribution. Within the secondary particles—between the primary particles—particularly small cavities and pores are present in the nanometer range, i.e. so-called mesopores, whereas larger cavities or pores are formed between the individual secondary particles.

Upon use of such a porous template the inner surfaces of the pores and cavities are occupied during infiltration with the precursor for the turbostratic carbon, so that the pore structure given in the template is more or less exactly transferred to the carbon structure which therefore has a hierarchical structure with oligomodal pore size distribution, with the hierarchical structure corresponding to the template.

In the simplest case the soot deposition process comprises a layerwise deposition of $SiO_2$ particles on a carrier moved relative to the reaction zone with formation of a $SiO_2$ soot body. As an alternative, the silicic acid powder obtained during the soot deposition process is further processed with the help of granulation, press, slip or sinter processes into intermediate products or the template. Granulates or flakes should be mentioned as intermediate products.

The monolithic $SiO_2$ soot body obtained thereby, or parts thereof, can be directly used as a soot preform, the monolithic structure facilitating the infiltration according to method step (a) II. The layer structure of the soot body can be found again in the carbon product and manifests itself in a platelet-like or flake-like morphology.

This carbon product is e.g. suited as a start material for the production of the electrode of a lithium ion battery, and it is distinguished by a high and quick charging capacity due to its hierarchical pore structure.

The template is removed after carbonization according to method step (a) (III) and before infiltration according to method step (b).

The removing operation is preferably carried out by chemical dissolution, wherein in the case of a silicic acid preform especially acids (such as fluoric acids) or bases (such as sodium hydroxide) should be mentioned as solvents. The template just serves as a mechanically and thermally stable skeleton for depositing and carbonizing the carbon precursor. The resulting carbon product is substantially free of silicic acid soot, so that the surface area which has previously been occupied by silicic acid soot is also freely accessible.

It has turned out to be advantageous when mesophase pitch is used as the carbon precursor substance according to method step (b).

Mesophase pitch, also called "mesophasic pitch" is a carbonaceous material which has an ordered liquid-crystalline structure. It is soluble in organic solvents, such as THF. The solution of the mesophase pitch infiltrated into the pores of the carbon structure leads after carbonization to a graphite-like deposition of carbon which forms the shell of the core-shell composite material and thereby closes the micropores of the carbon structure without clogging the cavities between the layer stacks.

Preferably, the carbon product is divided into finely divided carbon of porous particles.

In the method according to the invention, the carbon product is normally present as a monolith or with a platelet- or flake-like morphology and can be easily divided into smaller particles. The particles obtained after the dividing operation preferably exhibit a hierarchical pore structure and are e.g. further processed by means of standard paste or slip methods into shaped bodies or layers.

The further processing of the carbon product obtained according to method step (c) into an electrode for a lithium battery is carried out on the basis of the methods known from the prior art.

As for the porous carbon product, the above-mentioned object starting from a carbon product of the aforementioned type is achieved according to the invention in that the first carbon variety consists of turbostratic carbon having a first microporosity and the second carbon variety consists of graphite-like carbon having a second microporosity smaller than the first microporosity.

The porous carbon product according to the invention comprises a core-shell structure in which turbostratic carbon forms the core, and graphite-like carbon forms the shell.

Turbostratic carbon comprises a layer structure of graphene layers. In contrast to graphite with a crystallographic long-range order of the graphene layers, the layer structure in turbostratic carbon is however more or less disordered due to translation or rotation of individual layer stacks. Almost all of the synthetically produced carbon products and so-called amorphous carbon (glassy carbon) are present with a turbostratic layer structure. Carbon with turbostratic layer structure is not graphitizable by heating to a high temperature. Despite the presence of layer stacks of carbon, turbostratic or non-graphitizable carbon is normally not suited for application as an electrode material of rechargeable lithium batteries because it typically has a high microporosity and together with this a high specific surface area which leads to irreversible capacity losses during the first charging of the battery.

On the other hand, turbostratic or non-graphitizable carbon can be produced at relatively low costs. Almost all of the synthetically produced carbon products and so-called amorphous carbon (glassy carbon) are present with a turbostratic layer structure. As a consequence, the use thereof as an electrode material would be desirable.

To permit this, the turbostratic carbon is surrounded according to the invention with a shell of graphitizable carbon which after carbonization is present as a "graphite-like carbon". This carbon shows a graphitic or graphite-like layer structure which may contain turbostratic portions and which particularly exhibits a small specific surface area and low microporosity. The graphite-like carbon reduces the microporosity and the specific surface area of the composite material without considerably impairing the accessibility to the carbon layer stacks of the turbostratic carbon.

The disadvantageous microporosity of the turbostratic carbon is drastically reduced by the graphite-like carbon and is ideally eliminated altogether, and a low-cost carbon product is obtained having properties corresponding in terms of morphology and surface to those of an expensive carbon product consisting of purely graphitic start material, and which is particularly suited for use as an electrode material for a lithium battery.

The porous carbon product is preferably produced by means of the above-described method and is usually present in the form of porous carbon flakes. These have a layer-like morphology and comprise a carbon layer, but normally a plurality of individual carbon layers. Each carbon layer consists of a porous carbon skeleton. Carbon flakes that are not composed of discrete, displaceable individual particles, but which are formed by a carbon skeleton or by plural coherent carbon skeletons, are present within the electrode. This reduces the risk of ageing phenomena, such as an increase in transition resistances.

Particularly preferred is a porous carbon product with hierarchical pore structure.

This structure is obtained due to the production of a silicic-acid soot template by gas phase deposition, as has already been explained in more detail with reference to the method according to the invention, and is particularly well suited for the production of the electrodes of chargeable lithium ion batteries with a high and quick charging capacity.

Preferably, the carbon product is present in the form of porous carbon flakes consisting of carbon layers having a mean layer thickness in the range of 10 µm to 200 µm, preferably in the range of 30 µm to 100 µm.

The layer structure of the carbon flakes reflects a layer-like anisotropic mass distribution of the silicic acid preform. Layer thicknesses of less than 10 µm can lead to a low mechanical stability of the carbon flakes. Carbon flakes having a thickness of more than 200 µm are more and more inhomogeneous over their thickness.

When the carbon flakes are used for producing an electrode layer of a lithium ion accumulator, the layer thickness of the carbon flakes is ideally in the order of the thickness of the electrode layer. Transition resistances between smaller discrete carbon particles are thereby avoided or reduced.

To produce such an electrode layer, the carbon flakes are dispersed into a liquid and further processed by means of the known methods into the porous carbon layer.

As for the use of the carbon product, the above-indicated object is achieved according to the invention in that a porous carbon product according to the invention is used for producing an electrode for a rechargeable lithium ion battery.

EMBODIMENT

The invention shall now be explained with reference to an embodiment and a drawing in more detail. In detail.

Figure 1:
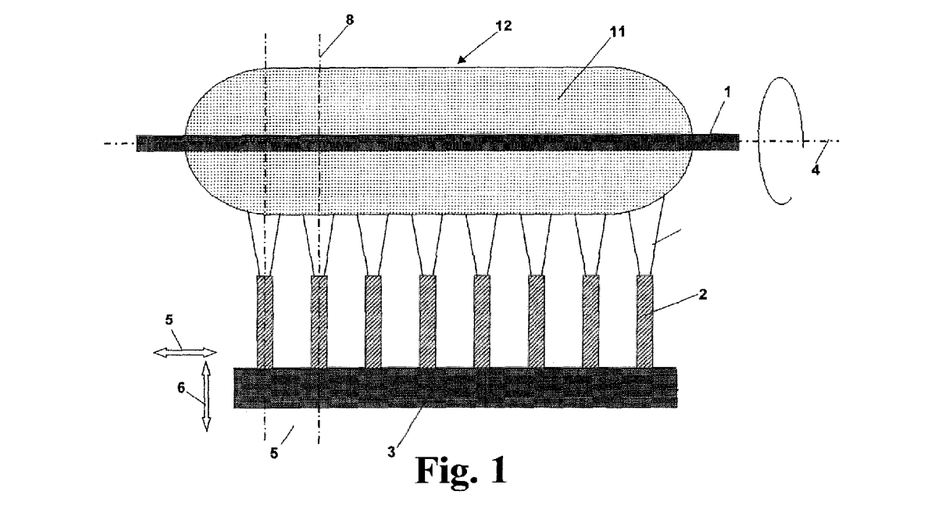
FIG. 1 shows a device for producing a $SiO_2$ soot body in a schematic illustration.

The apparatus shown in FIG. 1 serves to produce a $SiO_2$ soot body. A plurality of series-arranged flame hydrolysis burners 2 are arranged along a carrier tube 1 of aluminum oxide. The flame hydrolysis burners 2 are mounted on a common burner block 3 which is reciprocated in parallel with the longitudinal axis 4 of the carrier tube 1 between two turning points that are stationary relative to the longitudinal axis 4, and which is displaceable in a direction perpendicular thereto, as outlined by the directional arrows 5 and 6. The burners 2 consist of quartz glass; their distance from each other is 15 cm.

A burner flame 7 having a main propagation direction extending in a direction perpendicular to the longitudinal axis 4 of the carrier tube 1 is assigned to each of the flame hydrolysis burners 2. $SiO_2$ particles are deposited by means of the flame hydrolysis burners 2 on the outer cylindrical surface of the carrier tube 1 which is rotating about its longitudinal axis 4, so that the porous $SiO_2$ blank 8 is built up layer by layer with an outer diameter of 400 mm. The individual $SiO_2$ soot layers have a thickness of about 50 µm average.

The flame hydrolysis burners 2 are each fed with oxygen and hydrogen as burner gases and with $SiCl_4$ as the feedstock material for the formation of the $SiO_2$ particles. The burner block 3 is here reciprocated with an amplitude of two burner distances (thus 30 cm). During the deposition process a mean temperature of about 1200° C. is set on the surface 9 of the blank during the deposition process.

After completion of the deposition process a tube of porous $SiO_2$ soot (soot tube) is obtained with a length of 3 m, an outer diameter of 400 mm and an inner diameter of 50 mm. The temperature during build-up of the soot body is kept comparatively low, so that the $SiO_2$ soot material has a low and mean relative density of 22% (based on the density of quartz glass 2.21 $g/cm^3$).

The soot tube is subjected to a computed tomography examination (CT examination). The sooth tube is here radiographed over its length. The images obtained thereby allow quantitative and qualitative statements on the $SiO_2$ mass distribution and on the intensity and homogeneity of the axial and radial layer structure of the soot tube.

Figure 2:
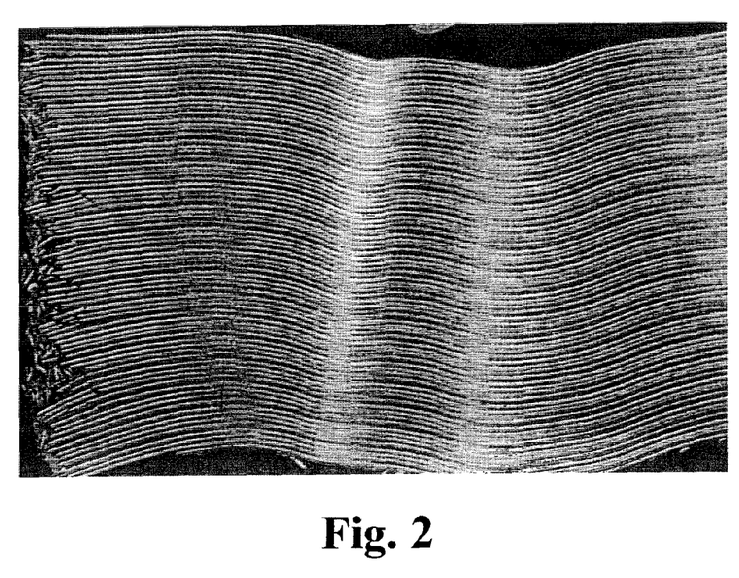
FIG. 2 is a computer tomography image of a soot body in a view taken in the direction of the longitudinal axis of the soot body.

FIG. 2 shows the corresponding CT image With this recording technique, areas with a relatively high density appear as bright surface areas. On the basis of the distinct brightness differences, one can clearly discern layers extending in parallel with one another and having a layer thickness of about 50 µm.

Figure 3:
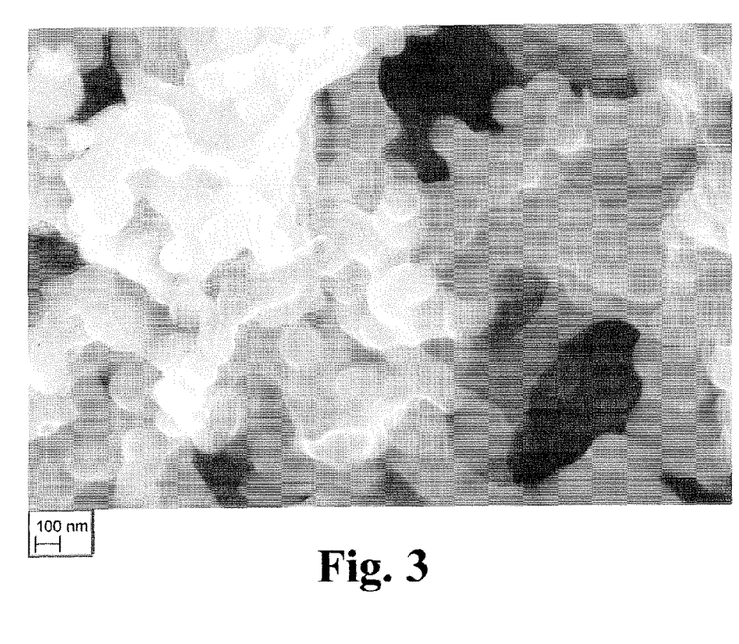
FIG. 3 is a SEM image of a silica preform with hierarchical pore structure.

The SEM image of the soot body according to FIG. 3 shows a skeletal structure with a multitude of coherent pores and cavities of different sizes. The skeletal structure is composed of individual spherical and intergrown $SiO_2$ secondary particles, with a finely rugged surface through which large cavities extend in the form of channels. A measurement of the specific inner surface area according to the BET method yields measurement values of about 20 $m^2/g$.

Parts of the soot body are used as a template for producing porous carbon, as schematically illustrated in FIGS. 9a to 9d and as explained in more detail hereinafter with reference to said figures.

In a first test, samples of the $SiO_2$ soot body are introduced into an immersion bath of a solution of mesophase pitch in THF. The impregnated sample is subsequently dried. Said impregnation and drying steps are repeated until there remains no significant free pore volume any more.

Figure 4:
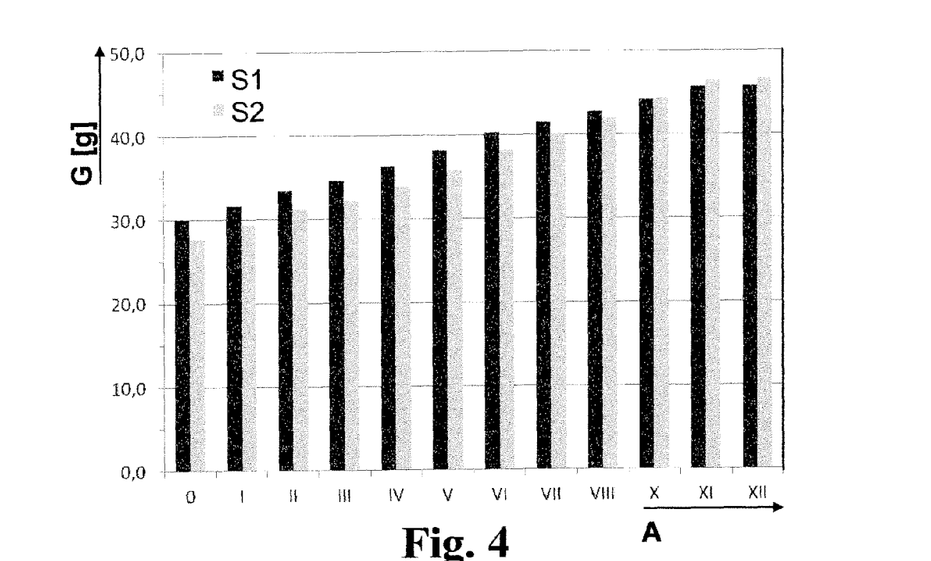
FIG. 4 is a diagram showing the infiltration increase per infiltration step in the use of mesophase pitch for two respective samples.

The diagram of FIG. 4 shows the corresponding weight increase "G" (in g) with the number "A" of the infiltration steps for two samples S1 and S1 from different areas of the soot body. Hence, saturation is only reached after 10 to 11 infiltration steps.

In a second test, samples of the soot body are introduced into an immersion bath of an aqueous saturated solution of cane sugar. The impregnated material is subsequently dried. These impregnation and drying steps are repeated until there remains no significant free pore volume any more.

Figure 5:
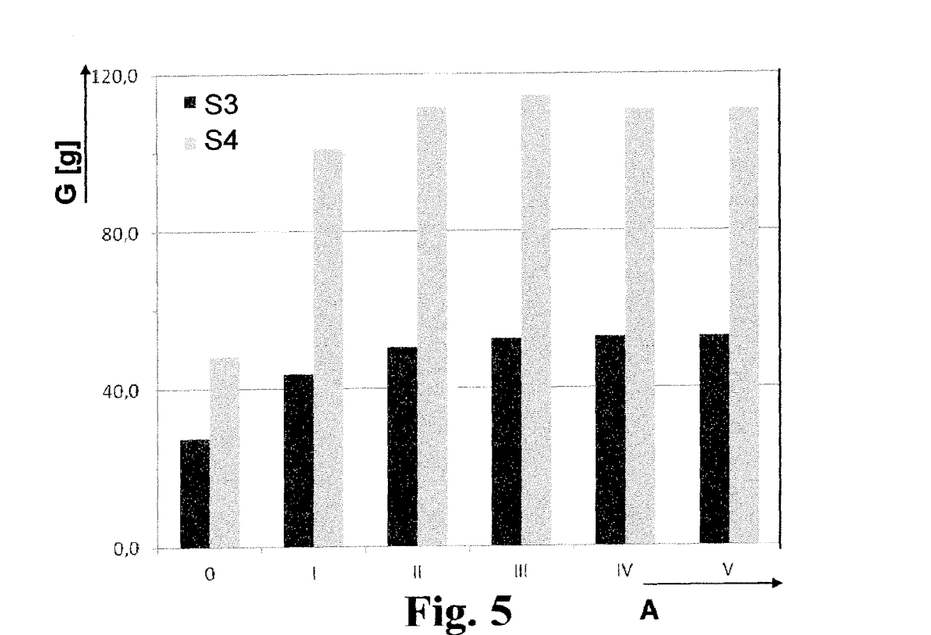
FIG. 5 is a diagram showing the infiltration increase per infiltration step in the use of sugar solution for two respective samples.
Figure 6:
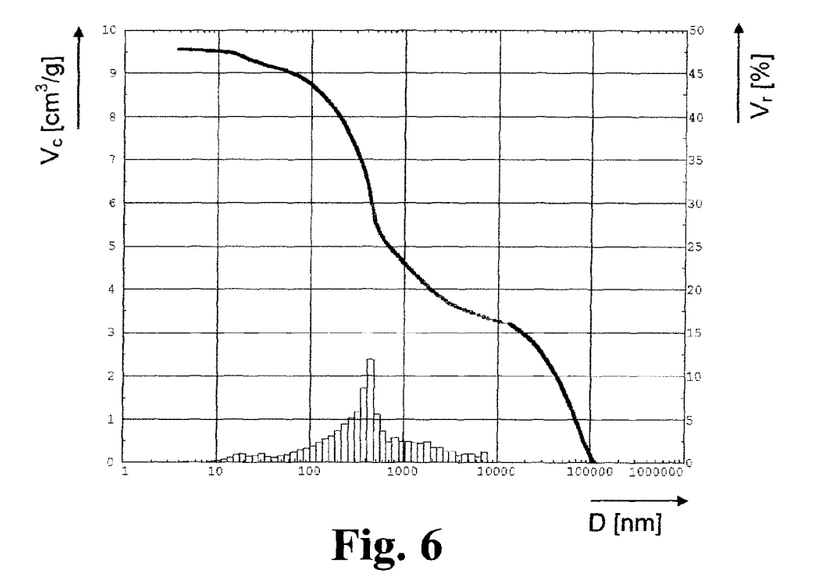
FIG. 6 is a diagram showing the pore size distribution in a precursor consisting of turbostratic carbon, determined by mercury porosimetry.

The diagram of FIG. 5 shows the corresponding weight increase "G" (in g) with the number "A" of the infiltration steps for two samples S3 and S4 from different areas of the soot body. Hence, saturation is already reached after two infiltration steps. The necessary number of infiltration steps is thus by the factor 5 smaller than during use of mesophase pitch for infiltration.

Figure 9A:
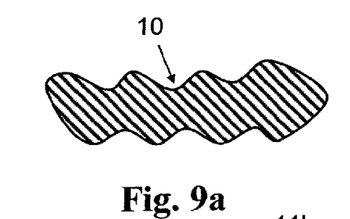
FIGS. 9a to 9d show production stages of the carbon product according to the invention in a schematic illustration.
Figure 9B:
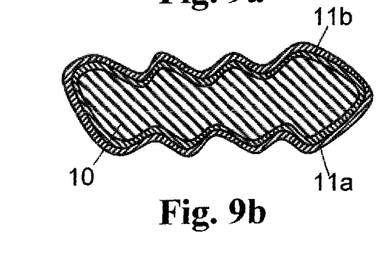

The sample of $SiO_2$ soot body and dried cane sugar layers as obtained on the basis of the second test is carbonized by heating in nitrogen at 700° C. A porous composite structure of spherical $SiO_2$ secondary particles 10 as the core and of a two-layered envelope 11a, 11b of turbostratic, non-graphitizable carbon is formed. The composite structure has a specific surface area (according to BET) of about 600 $m^2/g$, wherein the distinct increase in the specific surface area in comparison with the $SiO_2$ soot area is substantially due to a high microporosity of the layers 11a, 11b of turbostratic carbon.

Figure 9C:
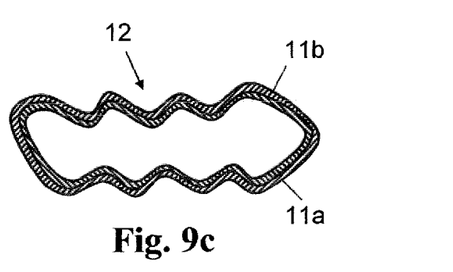

As shown in FIG. 9c, the spherical $SiO_2$ secondary particles 10 (i.e. the hard template of $SiO_2$ soot material) is subsequently removed. This is done by introducing the impregnated soot body sample into a fluoric acid bath. After the spherical $SiO_2$ secondary particles 10 have been etched away, a pre-product 12 of porous turbostratic carbon is obtained, the pore structure of which derives from the original spherical $SiO_2$ secondary particles 10, and which resembles the pore structure of the template. Particularly, it is distinguished by a hierarchical pore structure having a multitude of relatively large pore channels (macropores) which extend through an otherwise finely rugged surface structure. The pre-product 12 is flushed and dried.

Figure 8:
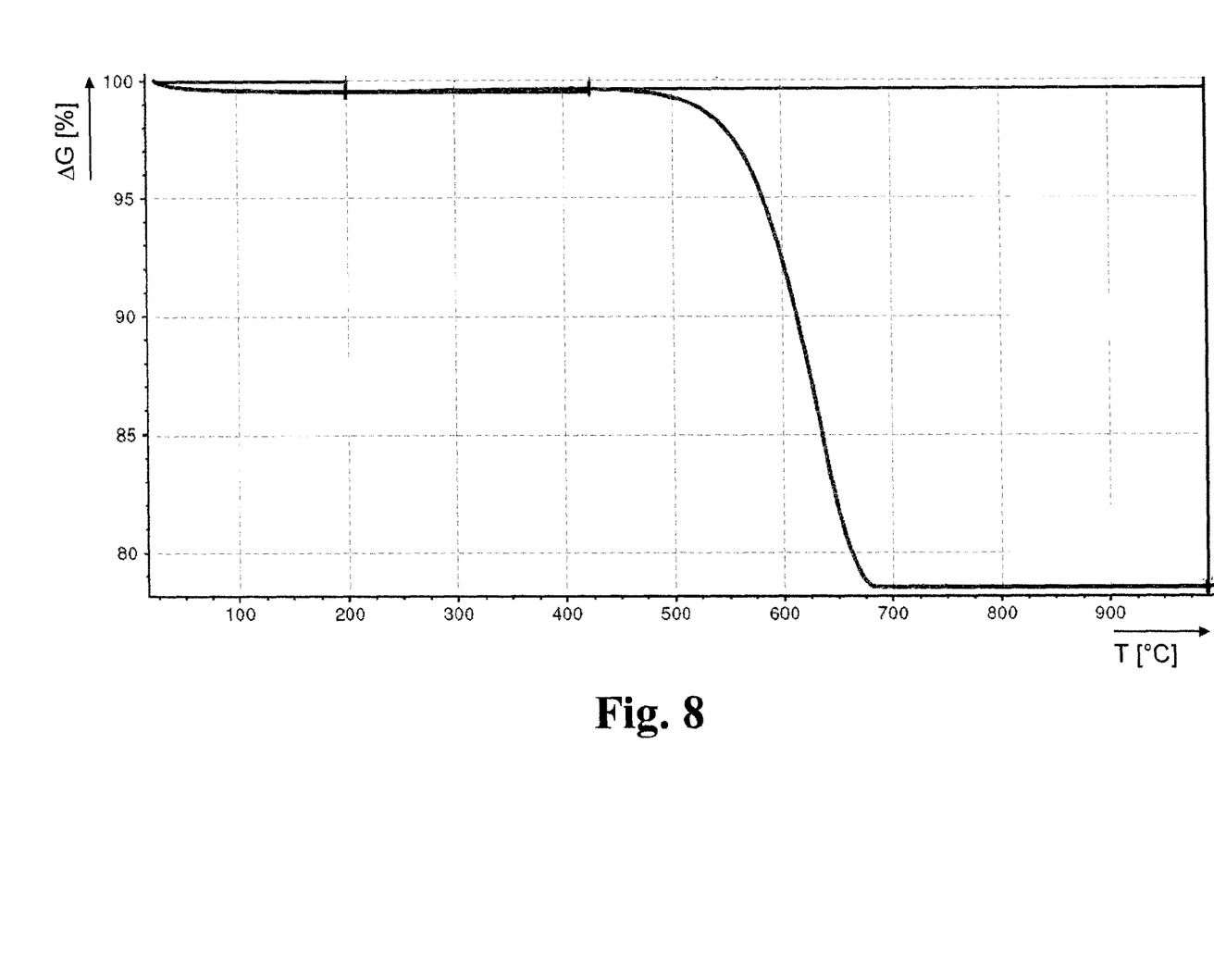
FIG. 8 is a diagram on thermogravimetric analysis during heating of a precursor with non-graphitizable carbon in an oxygen-containing atmosphere.

The diagram of FIG. 8 shows the pore size distribution of the porous carbon pre-product obtained thereby. On the left ordinate, the cumulative pore volume $V_c$ in $[cm^3/g]$ is plotted and on the right ordinate the relative pore volume V in [%] against the pore diameter D in [mm] (logarithmic plotting). Attention must here be paid that the illustrated measurement results were obtained by means of a mercury porosimeter measurement. The technique is based on the intrusion of the unwetted liquid mercury into a porous system under pressure. This method furnishes reliable information on the pore size distribution, the pore volume, the apparent density and the true density in the range of macropores up to large mesopores, but not for pores in the nanometer range, so that a discrepancy with respect to the value of 600 $m^2/g$ as determined according to the BET method follows for the specific surface area. This can be explained by the fact that the pores in the nanometer range which make up the greatest fraction with respect to the whole inner surface cannot be detected by the mercury porosimeter measurement.

It can be discerned that the porous turbostratic carbon is distinguished by a wide pore size distribution that ranges from about 5 nm to 100,000 nm and shows a maximum at a pore size of about 500 nm.

For the purpose of activation and elimination of active carbon centers inside the porous carbon pre-product, said product is heated in air for a short period of time to a temperature of 400° C.

The further preparation for graphitization is carried out in the standard way by impregnation with mesophase pitch dissolved in THF. A single impregnation step is here enough for eliminating the microporosity of the turbostratic carbon almost entirely.

Figure 9D:
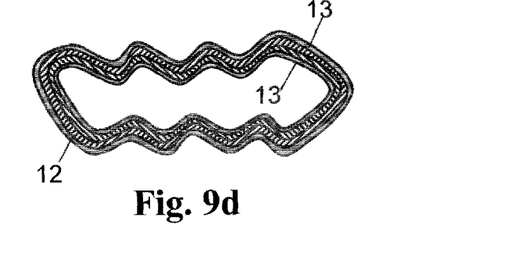

After a subsequent carbonization at a temperature of 700° C. a carbon product 14 with a layer-like configuration and with a graphite-like surface is obtained. As shown in FIG. 9d, the carbon product 14 is present as a core-shell structure with a two-layered core in the form of the carbon structure 12 consisting of turbostratic carbon, whose microporous structures 12 are covered by a shell 13 of graphite-like carbon.

From a morphological point of view, the carbon product 14 obtained thereby is composed of a multitude of layers of a platelet-like or flake-like configuration that are bent and can be easily crushed. The individual paper-like layers that have a mean thickness of about 50 μm are due to the original layer structure of the SiO$_2$ soot body.

Figure 7:
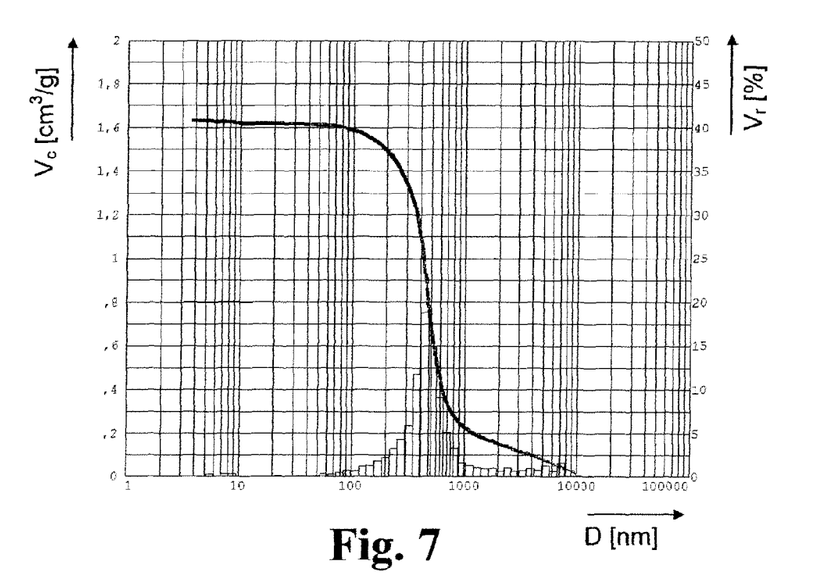
FIG. 7 is a diagram showing the pore size distribution after impregnation of the precursor of FIG. 6 with graphitizable carbon and subsequent carbonization, determined by mercury porosimetry.

The diagram of FIG. 7 shows the pore size distribution of the resulting porous carbon product, determined by mercury porosimeter measurement. On the left ordinate the cumulative pore volume V$_c$ in [cm$^3$/g] is plotted and on the right ordinate the relative pore volume V$_r$ in [%] against the logarithmically plotted pore diameter D in [nm].

It is discernible that the porous carbon product has a comparatively narrow pore size distribution which ranges from about 10 nm to 10,000 nm and which still shows a maximum at a pore size of about 500 nm. The specific surface area is, however, only about 30 m$^2$/g.

This carbon product is used as a start material for the production of the electrode of a chargeable lithium ion battery. To this end it is comminuted and received in a dispersion and processed with the help of the standard methods into the electrode. The platelet-like or flake-like morphology of the particles and their wide pore-size distribution as well as the hierarchical pore structure are here maintained. This is a precondition for a high and quick charging capacity of the lithium ion battery.

FIG. 8 shows the result of a thermogravimetric analysis (according to DIN 51005 and DIN 51006) in the treatment of a sample of the porous silicic-acid template, in pure oxygen, which has been impregnated with a two-layered cane sugar deposition until saturation, as has been described above. The weight loss ΔG in %, based on the initial weight, is plotted on the y-axis, and the carbonization temperature T in ° C. on the x-axis.

Hence, starting from a temperature of about 420° C., a first minor weight decrease manifests itself, which can be ascribed to the burning of active carbon centers. At a temperature of about 500° C. a distinct weight decrease is observed, which is due to the oxidation of the cane sugar deposition on the surfaces of the SiO$_2$ template before the change in weight at about 680° C. at a residual weight of about 78.5% of the initial weight ends in a saturation corresponding to the weight of the SiO$_2$ template.

The invention claimed is:

1. A method for producing a porous carbon product, comprising:
   providing a porous carbon structure with a first specific surface area,
   infiltrating the carbon structure with a precursor substance for graphitizable carbon,
   carbonizing the precursor substance so as to form the porous carbon product with a second specific surface area smaller than the first specific surface area,
   wherein said providing the porous carbon structure comprises:
   providing a template containing pores,
   infiltrating the pores of the template with a solution containing a precursor for non-graphitizable carbon,
   carbonizing the precursor so as to form the porous carbon structure having the first specific surface area, and
   removing the template.

2. The method according to claim 1, wherein the precursor for non-graphitizable carbon is water-soluble carbohydrate.

3. The method according to claim 1, wherein during said carbonization of the precursor, a carbon structure is produced with a specific BET surface area in a range of 400-600 m$^2$/g.

4. The method according to claim 3, wherein said carbonizing of the precursor substance takes place in an inert gas atmosphere at a temperature of at least 500° C.

5. The method according to claim 4, wherein said carbonizing of the precursor substance is followed by an activation treatment in an oxidizing atmosphere at a temperature ranging from 200° C. to 450° C.

6. The method according to claim 1, wherein while the carbon precursor substance is carbonized the porous carbon product is produced with a specific BET surface area of less than 50 m$^2$/g.

7. The method according to claim 1, wherein said providing the template comprises producing synthetic silica soot with a hierarchical pore structure.

8. The method according to claim 7, wherein said producing synthetic silica soot comprises a soot deposition process in which a SiO$_2$ start compound is converted by hydrolysis or pyrolysis into SiO$_2$ particles, wherein the SiO$_2$ particles are agglomerated or aggregated and deposited so as to form the template from the silica soot having an anisotropic mass distribution with the hierarchical pore structure.

9. The method according to claim 1, wherein the precursor substance is mesophase pitch.

10. The method according to claim 1, wherein the porous carbon product is produced in a form of finely divided porous carbon flakes.

11. A porous carbon product comprising a core-shell structure comprising a core of a first carbon variety and a shell surrounding the core and of a second carbon variety, wherein the first carbon variety is turbostratic carbon having a first microporosity and the second carbon variety is graphite-like carbon having a second microporosity smaller than the first microporosity.

12. The porous carbon product according to claim 11, wherein the porous carbon product has a hierarchical pore structure.

13. The porous carbon product according to claim 11, wherein the porous carbon product is in the form of porous carbon flakes comprising carbon layers having a mean layer thickness in a range from 10 μm to 200 μm.

14. A method comprising:
   providing a porous carbon product according to claim 11; and
   producing an electrode for a rechargeable lithium ion battery therewith.

15. The method according to claim 14, wherein the porous carbon product has a hierarchical pore structure.

16. The method according to claim 14, wherein the porous carbon product is in the form of porous carbon flakes comprising carbon layers having a mean layer thickness in a range from 10 μm to 200 μm.

17. The method according to claim 14, wherein the porous carbon product is in the form of porous carbon flakes comprising carbon layers having a mean layer thickness in a range from 30 μm to 100 μm.

18. The method according to claim 1, wherein the precursor for non-graphitizable carbon is saccharose.

19. The method according to claim 4, wherein carbonizing is followed by an activation treatment in an oxidizing atmosphere at a temperature in the range of 350° C. to 425° C.

20. The porous carbon product according to claim 11, wherein the porous carbon product is in the form of porous carbon flakes comprising carbon layers having a mean layer thickness in a range from 30 μm to 100 μm.

* * * * *